Feb. 5, 1963

B. ALTMAN ET AL 3,076,886

HINGED ELECTRICAL HEATER FOR OVEN TOP

Filed Oct. 10, 1960

INVENTORS
Bernard Altman
BY Paul Stiller

James C. Ledbetter
ATTORNEY

Feb. 5, 1963   B. ALTMAN ET AL   3,076,886
HINGED ELECTRICAL HEATER FOR OVEN TOP
Filed Oct. 10, 1960   2 Sheets-Sheet 2
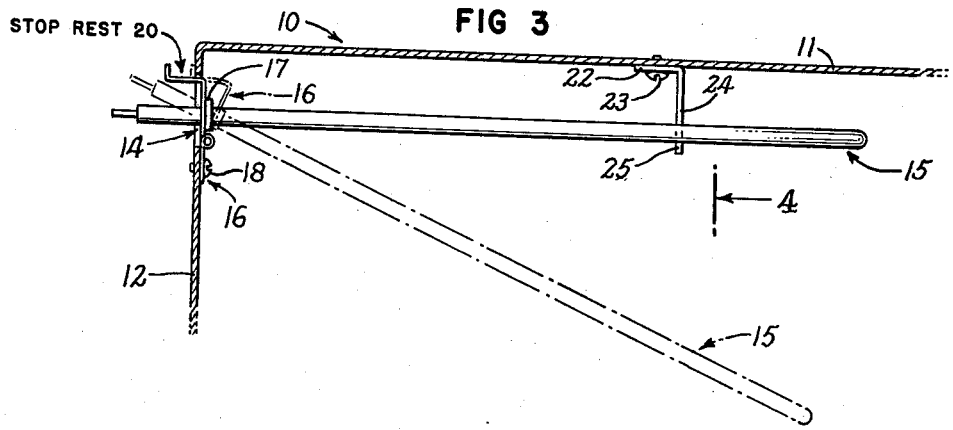
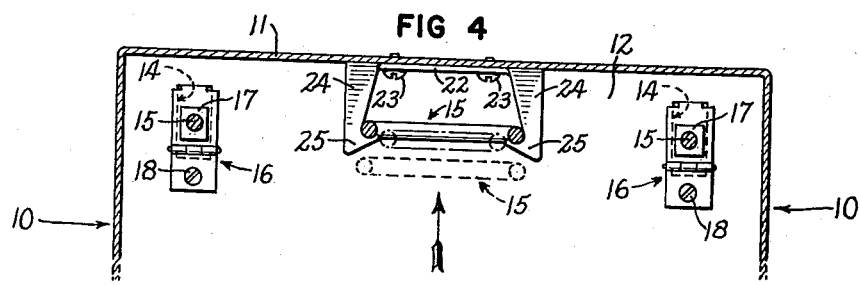
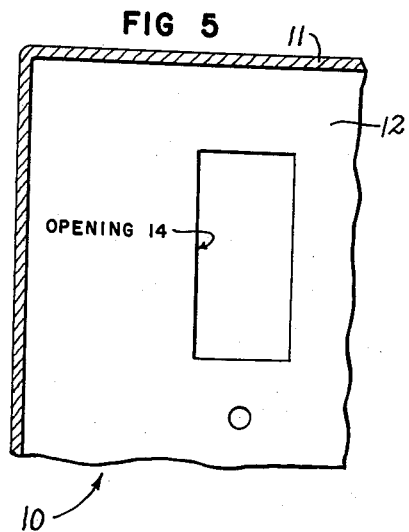
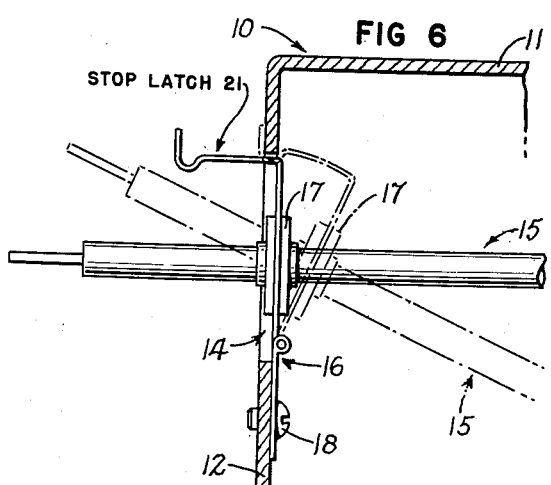
INVENTORS
Bernard Altman
Paul Stiller
BY
James C. Ledbetter
ATTORNEY

United States Patent Office 3,076,886
Patented Feb. 5, 1963

3,076,886
HINGED ELECTRICAL HEATER FOR OVEN TOP
Bernard Altman, Larchmont, and Paul Stiller, Mount Vernon, N.Y., assignors to Still-Man Manufacturing Corp., New York, N.Y., a corporation of New York
Filed Oct. 10, 1960, Ser. No. 61,705
1 Claim. (Cl. 219—37)

This invention relates to swingably mounted heaters, of the clad or tubular type, and more particularly to a hinged electrical heater for oven top, useful in ranges, especially in the upper portion of an oven, serving as a broiler or the like, and characterized by simplicity and convenience when cleaning the upper wall portions inside of an electrical oven.

An electrical heater is useful in the upper portion of an oven, to apply a broiling heat downward onto the top side of foods being cooked. In present day practice, the rear ends (terminals) of a heater are hinge-mounted, when it is desired to avail of the advantages in lowering a heater from its normally-up position to a temporary down position, out of the way, when cleaning the inner top wall portions of the oven.

Typical oven heaters of the prior art are shown in the following patents:

Ball, 1,094,771
Ammerman, 2,828,403
Price, 2,872,558
Kruse, 2,918,560 and a review of the entire body of the early and also the current art reveals a need for an oven top hinged heated, which is simple to manufacture and install, which provides a positive detent latch-up means of few parts for releasably holding the heater in normal service up position adjacent the top wall of the oven, and which does not add weight to the heater.

It is a purpose of this invention to produce an oven top heater meeting the foregoing requirements; and the new heater herein may be referred to for short as an oven latch-up heater.

The Views in the Drawings

The accompanying drawings now considered, together with this specification and claimed subject matter, illustrate the best mode contemplated in applying the principle of the invention and understanding the problems discovered as well as the new results achieved. Since these teachings may suggest structural changes to others, it is apparent that later modifications may well be equivalents and thus the same in spirit as this invention, as understood by a comparison thereof with the prior art.

Concerning the above noted drawings, it is pointed out that the legends printed thereon constitute the part names and the part numbers, as consistently recited in this specification for clarity in evaluating the invention.

For the purpose of illustrating the principle of this invention, an exemplary tubular heating element of known form has been selected having four legs, thus a multi-leg heater. It has two inner and two outer legs, integrally joined by three arcuate crotches. The result is an M-shaped pattern which is apparent in FIG. 1 and also observed when viewing FIG. 2 (a top view) at its left end. The M-shaped pattern is merely exemplary; other pattern forms may be adopted.

The conventional multi-leg, flexible crotch-joined, M-shape heater pattern is selected as a component of this novel combination because the inherent resiliency of its legs serves to implement the functions sought for solving the problem and providing a simple oven top hinged latch-up heater.

The conventional rigid cross-braces exampled in the foregoing listed prior art, for stiffening the legs of the M-shaped and similar heaters, are purposely omitted from this new construction. Omitting that prior art feature not only reduces the number of parts and the weight of the heater, but also avails of the advantage of the inherent flexibility in the several legs, joined by an arcuate crotch or crotches, and makes the resiliency serve a useful function as a spring actuated (spring-loaded) latching detent.

The drawings illustrate the rear ends (terminals) of the heating element (its two outer legs) as being hingedly attached to the upper portion of the rear wall of the oven. Observe that a fragment of the rear wall is shown in elevation in FIGS. 1, 4 and 5, as if looking into the oven through its open door (not shown), whereas it is in section in FIGS. 2, 3 and 6.

FIG. 1 is a front perspective of the oven top heater mounted in the upper portion of an oven by hinge and latch means. The front of the oven is cut away as by a vertical section. This illustration is made by looking upward into the oven. Note that the latched-up front portion of the heater is adapted to swing downwardly, as in FIGS. 3 and 6, dotted line position, for convenience when cleaning above it.

FIG. 2 illustrates a top plan (latch releasing action view) made on the line 2 of FIG. 1, located just beneath the oven (horizontal) top wall, thus omitting the top wall, and looking down on the hinged heater. The dot and dash lines of this action view indicate that the forward (front) portions of the heater legs are being manually sprung together (hand-gripped), so as to release them, in order that the heater may swing downward (FIGS. 3 and 6).

FIG. 3 is a side-view section, developed along the plane 3 of FIG. 2, but with the oven top wall in place. The dot and dash lines (at a downward angle) show the lowered position of the heater.

FIG. 4 is a transverse section made on the line 4 of FIG. 3, looking into the oven from its front side, illustrating the heater in its normal service (up) position, and looking toward the upper portion of the rear wall of the oven. The several legs of the heater (four in this example) are shown in cross-section.

In FIG. 4, the dot and dash lines with the arrow (at the center of the view) show the resilient action of the two inner legs of the M-shaped heater progressively moving upward, toward and into latch-up engagement with a stationary cam-hook means adapted to be mounted in the oven top wall.

FIG. 5 is a front elevation (enlarged) of the oven rear wall, being the left hand portion of FIG. 4, with one of its exposed clearance openings, before the hinge is mounted over it.

Figure 2:
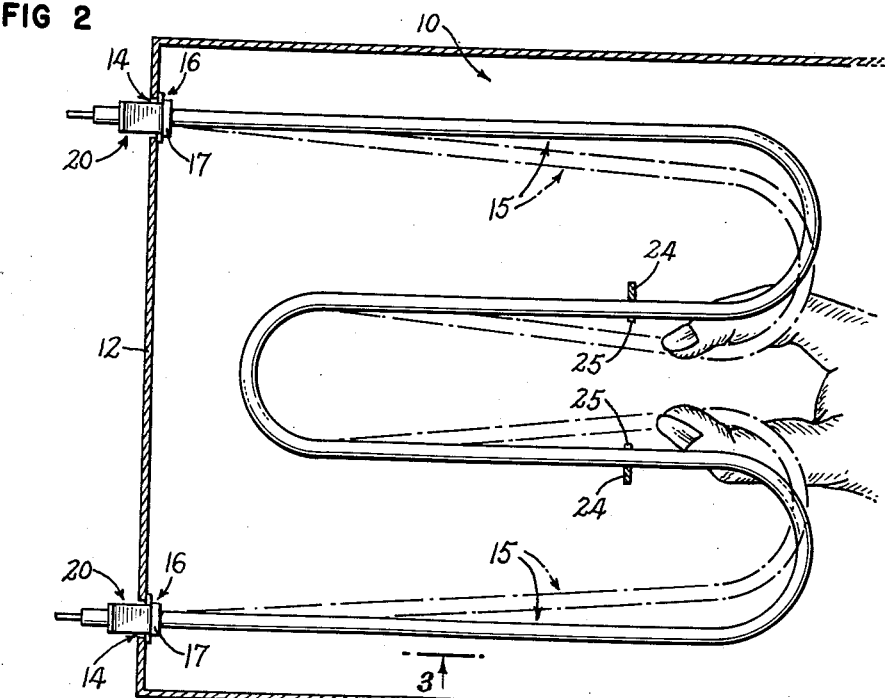

Note that FIGS. 2, 3 and 6 particularly illustrate two forms of a hinge-stop as a part of the hinge, for limiting its downward movement. FIGS. 2 and 3 show the first species thereof, in the form of a stop-rest; and FIG. 6 is a view of a modified or second species of the hinge-stop, in the form of a stop-latch, being a hold-down latch for the hinged heater, in contrast to the stop-rest of FIGS. 2 and 3.

The two forms of hinge-stop are illustrated for the purpose of completeness herein but are not a part of the improved spring-leg releasable latch-up detent located toward the front of the oven.

Although the foregoing description and illustrations are believed to constitute an overall disclosure of the invention, a further explanation in detail is made by referring to the legends and part numbers on the drawings.

Detailed Description

The drawings show the upper portion of a conventional electric oven 10, with a top wall 11, also its rear wall 12, and side walls (not numbered), as usual in oven structures. The top and rear walls 11 and 12 are emphasized as related to the heater-leg latch-up detent means comprising this invention.

Note that a rear wall clearance opening 14 is provided in the usual way in the upper portion of the oven rear wall 12. In this example of the invention, two of these wall openings 14 are shown, of rectangular shape and disposed in upright position. These two openings 14 are spaced apart in order to accommodate the two outer spaced crotch-joined legs of an M-shape or similar multi-leg heater indicated generally at 15.

Figure 1:
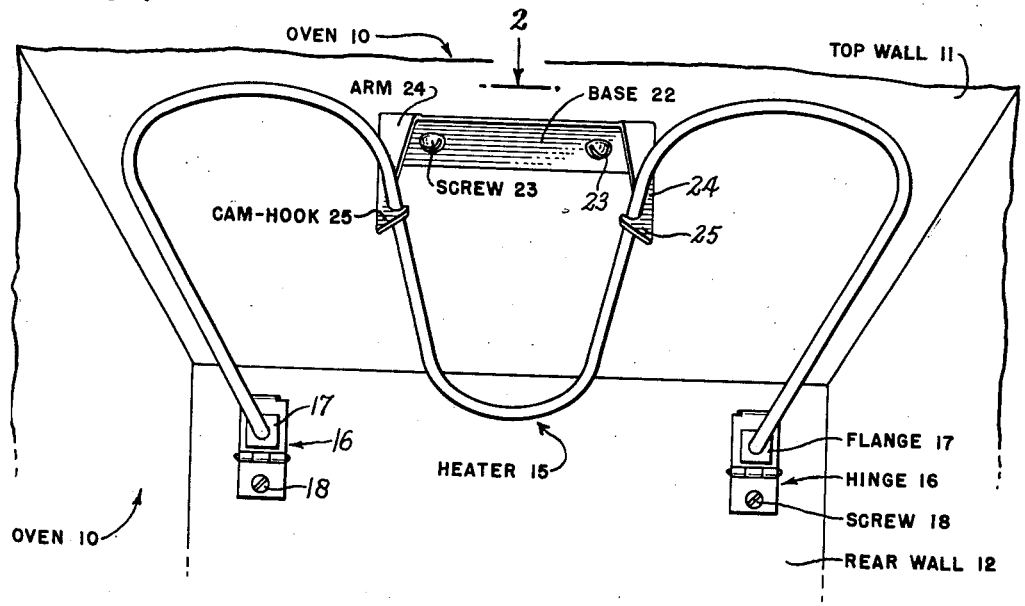

The heater 15 per se is of conventional structure, comprises a tubular metallic sheath, enclosing an electrical coil wire resistance heating element, and mineral packed for insulating the coil from its sheath. It is known in the art as a sheathed or clad heater. It is noted that the heater 15 has four legs, thus two inner and two outer legs, looped together at their three arcuate crotches, thus forming an M-shaped pattern (FIGS. 1 and 2).

The multi-leg shape of the heater 15 provides a long run of sheathed heating surface. The legs are inherently flexible laterally at their front ends, accentuated by the crotch or crotches. This front end resiliency of the heater legs in a horizontal plane prevails even though the rear ends of the two outer legs are hinge mounted on the rear wall 12. Note the inherent flexibility illustrated by the action view (FIG. 2), where an operator easily squeezes the two inner legs together, for unlatching and lowering the front end of the heater to its downward position, out of the way, when cleaning the upper portions of the oven 10.

The resiliency of the heater 15 (emphasized in FIGS. 2 and 4) is an inherent characteristic by reason of the conventional multi-leg or M-shaped pattern selected as a structural example herein. The adaptation of that characteristic function is believed to be novel in making it serve a useful purpose in detent latching the heater in its up position, parallel to the oven top wall 11, and in releasing it therefrom (FIGS. 2 and 3).

In other words, a survey of the prior art reveals that a multi-leg sheathed (clad) heater—made rigid by braces—is known to the art. However, to leave it flexible and utilize that function heretofore overlooked—with its several attendant advantages—results in reducing the number of parts and simplifying the assembly of hinged electrical heaters.

It is noted that a hinge means 16 comprises a flat rectangular two-piece member pivotally joined by a pintle bearing, illustrated here as ordinary hinge practice. However, in manufacturing this oven top heater for the trade, a special one-piece flexure hinge of an earlier invention is preferably used.

The hinge 16 is mounted upright on the inside surface of the rear wall 12 over the wall opening or openings 14 to close it or them. This thin and flat rectangular hinge member 16 serves the several purposes of (a) extending over (covering) the opening or openings 14 to prevent escape of heat and food vapors from the oven, (b) hingedly mounting the multi-leg heater 15, and (c) establishing an electrical ground connection between the heater and the oven, especially so in using our preferred one-piece flexure hinge noted in the preceding paragraph.

A clamping flange 17 is fixed to the front surface of the hinge 16, on the upper pivoted member thereof, where the outer leg of the heater extends through the hinge, thence through the rear wall opening 14, and connected with electrical conductors in the usual way. This flange 17, mounted above the pintle bearing of the hinge, provides clamping thickness and supporting stock for the tubular sheath of the heater 15.

Note that the clamping flange 17 is integrated with the hinge 16, as by riveting or welding these two parts together, thus providing a fixed and rigid clamping support for the heater leg or legs carried in said hinge or hinges 16. The flange 17 is die-swaged (up-set) around the metallic sheath of the heater 15 and thus, by compression, clamps it immovably in the hinge 16.

A fastening means 18 secures the lower pivoted member of the pintle hinge 16 to the rear wall 12 in the upper portion of the oven. Note that this fastening means is shown as a self-tapping screw fastening 18, and that it is located below the flange 17, hence underneath the rear end or ends of the leg or legs of the heater 15. This arrangement leaves the upper pivoted member of the hinge 16 free to swing back and forth (FIGS. 3 and 6) on its pintle bearing.

A hinge stop (two forms) is illustrated (FIGS. 3 and 6) as an arm carried on the top end of the upper pivoted member of the hinge 16. The arm extends rearward through the opening 14 and limits the angular down swing of the hinge, to prevent the front end of the heater from dropping down to the bottom of the oven.

FIG. 3 illustrates the hinge stop in the form of stop-rest 20, wherein the above mentioned arm moves freely through the opening 14. An upturned toe on the rear end of the stop-rest arm comes to rest against the outer surface of the rear wall 12 and stops the downward swing of the front end of the heater at its dotted line position (FIG. 3).

FIG. 6, on the other hand, illustrates another hinge stop, in the form of a stop-latch 21. The arm is made of spring steel (a leap spring) and resiliently bears (frictionally) against the upper edge of the opening 14 during back and forth sliding movement. A latching groove on rear end of the stop-latch arm snaps (spring detent latching action) onto the edge of the opening, thus limiting the downward swing of the heater to its dotted line position (FIG. 6). This stop-latch imposes a releasable hold down grip against upward displacement in the event one's arm bumps into the heater when cleaning around it.

*The Spring-Like Heater 15 Latches Up by Its Own Spring Action*

As said before, a feature of the invention relates to the discovery of a new and useful utility for the spring resiliency which inheres in the multi-leg clad heater 15. After it is fabricated, it is not made rigid with cross braces in the manner taught by the prior art. The result is a lighter weight heater of less number of parts.

A base 22 of a rigid latch arm is adapted to be screw-fastened at 23 on the inner surface of the top wall of the oven 10. Screws 23 secure the base 22 of this latch to the oven top wall.

A pair of spaced apart rigid latch arms 24 are integrally formed with the base 22 and depend from the top horizontal wall 11 of the oven. The lower end of each latch arm 24 is formed with a tapering (partially rounded) portion in the form of a cam-hook 25. These two cam-hooks 25 are spaced apart to conform with the spacing of the two inner resilient legs of the multi-leg heater 15 and readily grasp and hold them when the heater is swung upward and sprung into latch-up position, the action of which is demonstrated in FIG. 4.

For releasing the heater 15 from the cam-hook or hooks 25, so as to lower it, the operator manually squeezes the two inner legs toward each other and thus disengages them from the cam-hooks 25 (as in dotted lines in FIG. 2). The heater then lowers itself by gravity (or it is pushed down) to the position shown (FIGS. 3 and 6 in dotted lines), out of the way, for cleaning the upper portion of the oven.

The heater is restored to its latched-up position by pushing it upwardly (FIG. 4) against the cam-hooks 25, which cause the two inner legs to spring together and snap latch into service position.

What is claimed is:
In a hinged electrical heater, of the tubular sheathed multi-leg type, adapted to be installed in the upper portion of an oven having an opening or openings in its upright rear wall, through which the heater terminals extend, said terminals being carried by a hinge means mounted on said wall, for hingedly installing the heater in service position, and a latch-up detent for holding said heater in its service position;

that improvement in said latch-up detent, which comprises the following concept with its implementing means, in combination:

first, the discovery and selective adaptation of said multi-leg heater, in order to avail of its spring flexibility, which is inherent in the combined length of its legs, and which provides the spring-loading action for energizing the aforesaid latch-up detent;

also, second, a latch-up bracket of rigid form provided separately of the heater, adapted to be fixed on the inner surface of the top wall of the oven, located above the flexible heater, and toward the front of said oven;

and a rigid supporting arm means formed on the bracket, extending downward, with a rigid cam-hook on the lower end of said rigid supporting arm means, in alignment with a said flexible leg of the heater; whereby said heater, in the resiliency of its said spaced apart legs, spring latches into supported engagement with the rigid cam-hook, when the front portion of said heater is pushed upward, and is releasably held thereby;

and whereby the resilient heater leg may be manually sprung out of engagement with the rigid cam-hook, and swung downward, for the purpose of cleaning around the heater.

References Cited in the file of this patent

UNITED STATES PATENTS

| | | |
|---|---|---|
| 994,913 | Elliott | June 13, 1911 |
| 1,429,776 | Robinson | Sept. 19, 1922 |
| 2,641,493 | Flugrath | June 9, 1953 |
| 2,824,202 | Aylor | Feb. 18, 1958 |
| 2,836,697 | Jordan | May 27, 1958 |
| 2,918,560 | Kruse | Dec. 22, 1959 |